United States Patent [19]
Deutscher et al.

[11] 3,831,219
[45] Aug. 27, 1974

[54] WINDSCREEN WIPER

[75] Inventors: Hans-Christian Deutscher, Ludwigsburg; Kurt Bauer, Kleiningersheim, both of Germany

[73] Assignee: SWF Spezialfabrik Fur Autozubehor Gustav Rau GmbH

[22] Filed: June 29, 1972

[21] Appl. No.: 267,606

[30] Foreign Application Priority Data
June 30, 1971 Germany............................ 2132496

[52] U.S. Cl......... 15/250.21, 15/250.23, 15/250.25, 15/250.3
[51] Int. Cl............................ A47l 1/00, B60s 1/02
[58] Field of Search......... 15/250.21, 250.23, 250.3, 15/250.13, 250.29

[56] References Cited
UNITED STATES PATENTS
3,590,415  7/1971  Mori............................ 15/250.23 X
3,688,334  9/1972  Peterson............................ 15/250.3

Primary Examiner—Peter Feldman
Attorney, Agent, or Firm—Toren, McGeady and Stanger

[57] ABSTRACT

A windscreen wiper for obtaining a rectangular wiping area, comprising a wiper blade, a wiper arm, a guide arm and an oscillatory drive, the wiper blade being rotatably connected to one end of the wiper arm and being mounted, by means of a pivot member, on one end of the guide arm, wherein an axle is non-rotatably connected to a pivot arm, a double bearing being provided on the free end of the pivot arm, the wiper arm being non-rotatably connected to one part of the double bearing and the guide arm being rotatably connected to an intermediate lever which is non-rotatably connected to the other part of the double bearing, the two parts of the double bearing being driveable by separate toothed belt or chain drives, each drive comprising a driving wheel which is located concentrically with the axle but is non-rotatable therewith.

5 Claims, 4 Drawing Figures

WINDSCREEN WIPER

The present invention relates to a windscreen wiper, particularly for an automotive vehicle, for producing a rectangular wiping area.

In known windscreen wipers for producing a rectangular wiping area, a drive transmits the wiping movements directly to the wiper arm. A guide arm is flexibly supported on the bodywork of the vehicle and, in dependence upon the wiping movement of the wiper arm, changes the position of a wiper blade located at the end of the wiper arm. Such a windscreen wiper can only produce a substantially rectangular wiping area if the wiping area is small.

An increase in the wiping area can be obtained by using wiper and/or guide arms which are variable in length. Moreover, windscreen wipers are known in which the wiper blade is forcibly guided at the edges of the windscreens, thus varying the length of the wiper blade. The disadvantages of such an arrangement is that the sliding guides required therefor are extremely accident prone, particularly in adverse weather conditions such as snow and ice. Unacceptable fluctuations in pressure are caused to occur and the wiper arm is frequently subjected to excessive torsional stress.

The wiping area has also been enlarged and provided with a more rectangular shape by providing the guide arm with a separate drive to that of the wiper arm. For example, windscreen wiper has been proposed in which the wiper blade is rotatably mounted on a pivot arm. One end of the pivot arm is rotatably mounted on one end of the wiper arm. The necessary pivotal movement for the pivot arm may be transmitted through the guide arm by a transmission gear which is located on the bearing of the pivot arm on the end of the wiper arm. In the pivot arm, the wiper blade holder is fixedly connected to a gearwheel which is coupled to a gear wheel fixedly connected to the wiper arm by a driving chain. These gearwheels and the driving chain also ensure the parallel adjustment of the wiper blade in dependence upon the angular position of the wiper arm.

In such a windscreen wiper, a comparatively heavy weight is therefor located on the wiper blade end of the wiper arm. This effects the wiping speed and exerts laterally acting tilting moments on the wiper blade. This prevents the optimum wiping action from being attained. Moreover, this additional drive produces interference to the vision of the driver of the vehicle because it is constantly moved over the wiping area during wiping.

It is therefore an object of the present invention to control a windscreen wiper comprising a wiper arm and guide arm driven by separate drives in such a manner that if the wiping angles is large, a large wiping area is attained, and that in the region of the wiping area no driving elements are required which alter the pressure application of the wiper blade and the working speed of the windscreen wiper.

In accordance with the present invention, there is therefore provided a windscreen wiper for obtaining a rectangular wiping area, comprising a wiper blade, a wiper arm, a guide arm and an oscillatory drive, the wiper blade being rotatably connected to one end of the wiper arm and being mounted, by means of a pivot member, on one end of the guide arm, wherein an axle is non-rotatably connected to a pivot arm, a double bearing being provided on the free end of the pivot arm, the wiper arm being non-rotatably connected to one part of the double bearing and the guide arm being rotatably connected to an intermediate lever which is non-rotatably connected to the other part of the double bearing, the two parts of the double bearing being driveable by separate toothed belt or chain drives, each drive comprising a driving wheel which is located concentrically with the axle but is non-rotatable therewith.

Advantageously, the drives each additionally comprise a driven wheel, one driven wheel being non-rotatably connected to one part of the double bearing and the other driven wheel being non-rotatably connected to the other part of the double bearing.

Preferably, the double bearing comprises a shaft which is rotatably mounted in a bush, the bush itself being rotatably mounted in a bearing bush.

Further advantageously, the shaft is non-rotatably connected to the wiper arm and the bush is non-rotatably connected to an intermediate lever, the guide arm being rotatably connected to the intermediate lever, the bearing bush being non-rotatably connected to the pivot arm which in turn, is non-rotatably mounted on the axle.

Further preferably, the driving wheels are non-rotatably connected to the bearing bush receiving the axle.

Still further preferably the angle of rotation of the wiper arm and of the intermediate lever relative to the pivot arm is adjustable by varying the transmission ratios of the respective drives.

Still further advantageously the wiping area is determined by the angle of rotation and the length of the pivot arm, the angle of rotation of the wiper arm and the angle of rotation and the length of the intermediate lever.

Yet further preferably, the drives are covered by a housing located on the pivot arm.

Yet further advantageously, the axle is driven by a direct-acting linkage or by a transmission gear.

A further preferable feature of the invention consists in that both the wiper arm and the guide arm are provided with hinged joints in their end regions adjacent the pivot arm, the hinged joints permitting movement of the wiper arm and the guide arm to a position at right angles to the longitudinal axis of that arm.

The invention will be further described, purely by way of example, with reference to the accompanying drawings.

Figure 1:
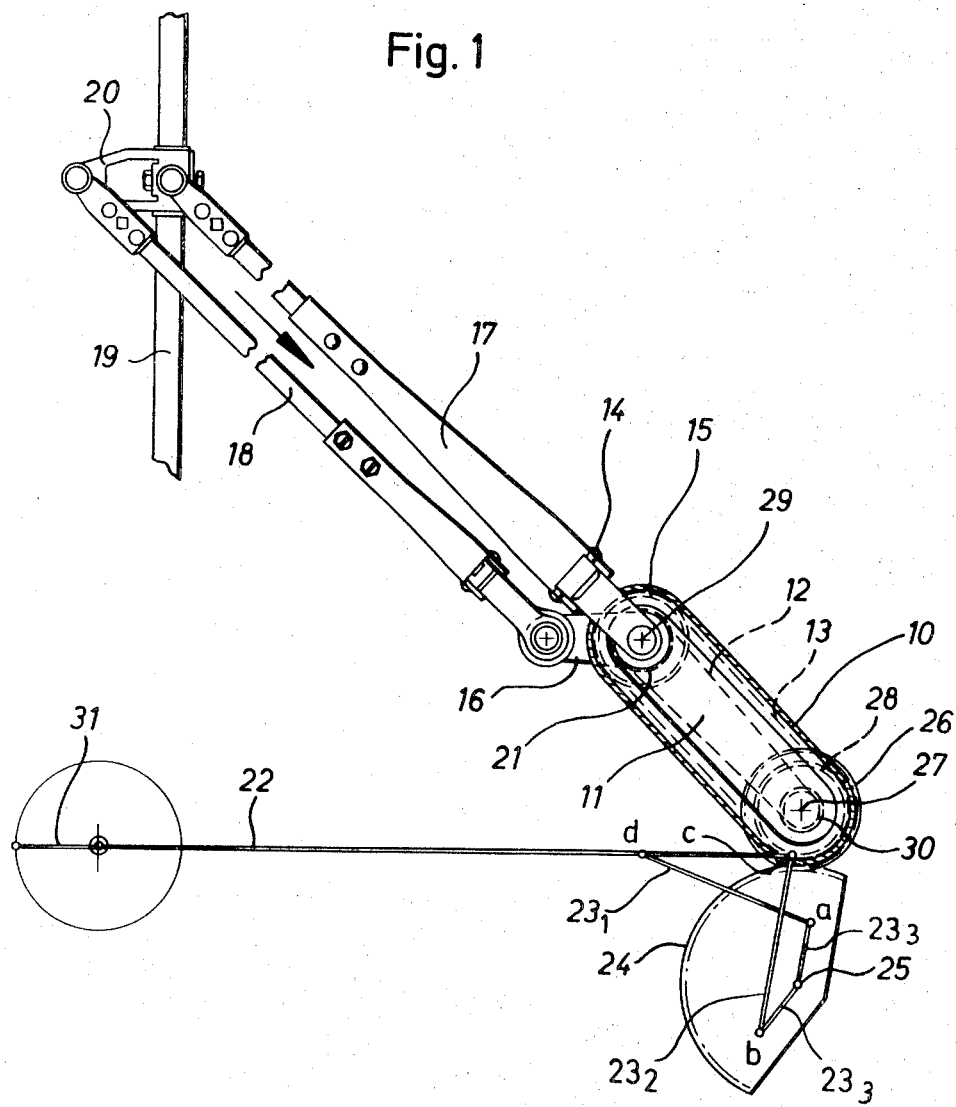
FIG. 1 is a partly schematic view of a windscreen wiper arm in accordance with the present invention.

In the drawing, the numeral 31 denotes the driving crank of a windscreen wiper motor. This crank rotates continuously and causes the driving rod 22 to reciprocate. The driving rod 22 is branched into a known cross-over guide 23. The cross-over guide 23 is pivotable about a pivot point 25, at which point the guide is fixedly connected to a toothed segment 24. An axle for the toothed segment 24 is fixedly mounted on the bodywork of a vehicle or on an assembly plate, not shown. The toothed segment 24 engages with a gearwheel 26 which is connected to an axle 27 but is non-rotatable therewith. This axle 27 is formed as a bearing pin which is rotatably mounted in a bush. The bush is also connected to the bodywork or to the assembly plate. This pin 27 is connected to a pivot arm 11 but is non-rotatable therewith. Consequently when the pin 27 executes an oscillatory movement, the pivot arm also executes a corresponding oscillatory movement. Two driving wheels 28 and 30 are fixedly connected to the bush of the bearing pin 27 and are concentrically aligned with the bearing pin 27. These driving wheels 28 and 30 are in operational engagement with driven wheels 15 and 21 of the drives by means of toothed belts or chains 13 and 12 which, in the region of a double bearing 29, are mounted on the pivot arm 11. These drives may be formed as known toothed belt drives or chain drives, whereby the driving and driven wheels associated with the transmission means may always be used.

The double bearing 29 comprises a shaft which is non-rotatably connected to a wiper arm 17 and the driven wheel 21 and is rotatably mounted in a bush. This bush is non-rotatably connected to a intermediate lever 16 and the driven wheel 15. This bush, moreover, is rotatably mounted in a bearing bush, which in turn is non-rotatably connected to the pivot arm 11. A guide arm 18 is rotatably connected to the other end of the intermediate lever 16. A wiper blade 19 is rotatably connected to the free end of the wiper arm 17 and may be adjusted by means of a pivot member 20, the free end of the guide arm 18 being connected to the other end of the pivot member 20.

If the axle 27 is moved in a clockwise direction by the toothed segment 24 and the gear wheel 26, the pivot arm 17 and guide arm 18 are moved therewith. By means of separate drives formed by the driving wheels 28 and 30, the transmission means 12 and 13 and the driven wheels 15 and 21, separate rotary movements are superimposed on the wiper arm 17 and the guide arm 18 respectively which for varying their position lead to the pivot arm 11. By providing appropriate transmission ratios for these drives, varying rotary movements may be provided for the wiper arm 17 and the guide arm 18. This allows adjustment to obtain a desired wiping area. The dimensions of the wiping area are, of course, also effected by the lengths of the pivot arm 11 and the intermediate lever 16, respectively.

When the pivot arm 11 is pivotally moved, the belts or chains 12 and 13 are in rolling engagement with the fixed driving wheels 26 and 30 and the driven wheels 15 and 21 are therefore rotated in an opposite direction. Thus when the pivot arm 11 is pivoted in a clockwise direction the driven wheels are rotated anticlockwise. By varying the transmission ratios of these drives, varying angles of rotation may be attained for both the wiper arm 17 and the guide arm 18.

The wiper arm 17 and the guide arm 18 may be retained away from the windscreen by the drives located on the pivot arm 11 by providing hinged joints 14 thereon. The drives may be covered by a small housing 10 which is fixed to the pivot arm 11 and is pivotally moved therewith.

For a more detailed description of the invention, reference is made to FIG. 1 in which the cross-over guide 23 is shown as consisting of three levers $23_1$, $23_2$ and $23_3$. The lever $23_3$ is a two-armed member and is rotatably mounted on a bearing shaft which forms the center of the axis of rotation for pivot point 25 for the toothed segment 24. The two-armed crank lever $23_3$ is joined to lever $23_1$ at point a and its other arm is joined to the lever $23_2$ at point b. The opposite or free ends of the levers $23_1$ and $23_2$ are linked to the driving rod 22 at spaced points d and c. The rotation of the driving crank is converted to a reciprocatory movement by the driving rod and its back-and-forth movement is transmitted to the gear segment 24 which effects a rotational movement about the pivot point 25 and drives the gear wheel 26 which, in turn, causes the axle to rotate. As the axle is rotated, it causes the pivot arm 11 to rotate about the axis of the axle and also moves the driving wheels 28 and 30. By means of the toothed belts or chains 12 and 13, the driving wheels 28 and 30 are in positive connection with the driven wheels 15 and 21. Due to the differences in the diameter of the driven wheels and the driving wheels, different transmission ratios are obtained. As can be noted in FIG. 1, the driving wheel 30 is positively connected via the belt 12 to the driven wheel 21 while driving wheel 28 is connected by the belt 13 to the driven wheel 15.

Figure 2:
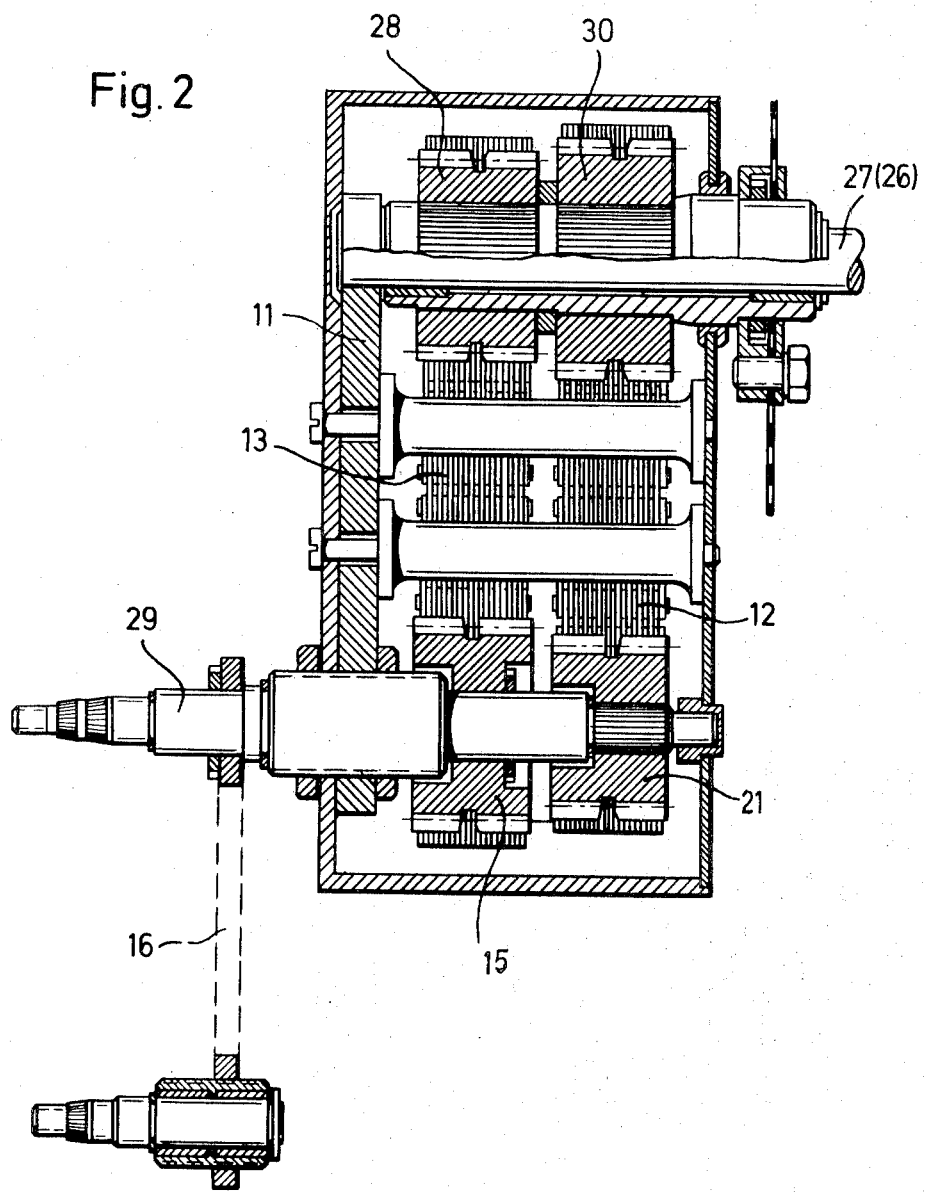
FIG. 2 is an enlarged sectional view of a portion of the arrangement shown in FIG. 1.
Figure 3:
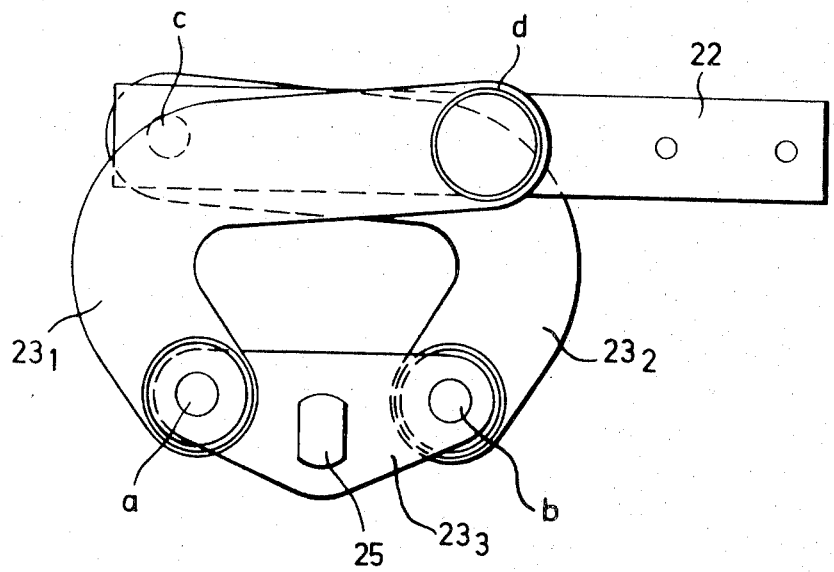
FIG. 3 is an enlarged detail view of a portion of the arrangement shown in FIG. 1.
Figure 4:
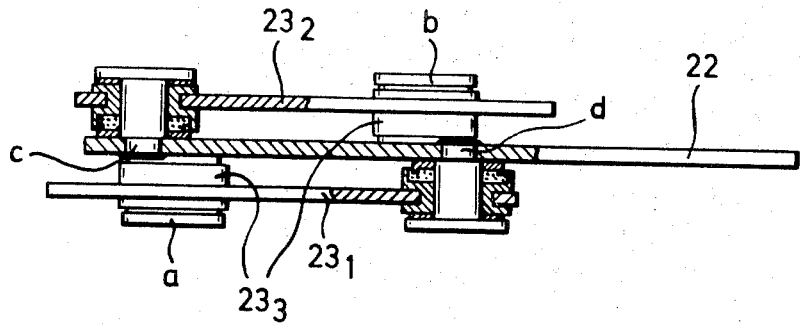
FIG. 4 is a top view, partly in section, of the detail shown in FIG. 3.

The double bearing 29 consists of a shaft on which the driven wheel 21 is fixed and a bush on which the driven wheel 15 is fixed, note FIG. 2. Further, the bush is rotatively mounted in a bearing bush to which the pivot arm is secured. Since the transmission ratio of the drive systems is different, the bush of the double bearing 29 affords the displacement of the guide arm to the intermediate lever 16 and the shaft of the double bearing effects the movement of the wiper arm 17. This arrangement permits the wiper blade 19 to travel over a rectangularly shaped wiping area due to the combination of the wiper arm and the assembly on the intermediate lever 16, guide arm 18 and pivot member 20. By this arrangement, it is possible to assure perpendicular guidance of the wiping blade during the entire wiping operation.

What we claim is:

1. A windscreen wiper for obtaining a rectangular wiping area, including a wiper blade, a wiper arm pivotally connected at one end to said wiper blade, a pivot member pivotally attached to said wiper blade at the common pivot axis with said wiper arm, a guide arm connected to said pivot member at a point spaced from said pivot members' pivotal attachment to said wiper blade, an axle, an oscillatory drive assembly operatively connected to said axle for rotating said axle, said axle comprising a bush and a bearing pin rotatably mounted in said bush, a pivot arm connected to and extending laterally from said bearing pin of said axle so that it rotates with said axle, a double bearing located at the opposite end of said pivot arm from said axle, said double bearing comprising a bearing bush, a bush rotatably mounted in said bearing bush, and a shaft rotatably mounted in said bush, said wiper arm secured to said shaft for rotation therewith, a first driven wheel secured to said shaft for rotation therewith, an intermediate lever fixed at one end to said bush for rotation therewith and pivotally connected at its other end to said pivot member, a second driven wheel secured to said bush for rotation therewith, said bearing bush rigidly attached to said pivot arm for movement therewith, a first driving wheel and a second driving wheel, each fixedly connected to said bush of said axle for rotation therewith, a first drive member fitted to each of said first driving wheel and said first driven wheel and a second drive member fitted to each of said second driving wheel and said second driven wheel so that said driven wheels are rotated.

2. A windscreen wiper, as set forth in claim 1, wherein said first and second driving wheels are each of a different diameter and said first and second driven wheels are each of a different diameter and the angle of rotation of said wiper arm and of said intermediate lever relative to said pivot arm is adjustable by varying the transmission ratios of said driving and driven wheels.

3. A windscreen wiper, as set forth in claim 1, wherein a housing encloses said pivot arm, said first and second driving wheels, said first and second driven wheels and said first and second drive members extending therebetween.

4. A windscreen wiper, as set forth in claim 1, wherein said oscillating drive assembly includes a rotatable driving crank, a driving rod connected at one end to said crank so that it effects a reciprocatory movement in response to the rotation of said crank, a cross-over guide connected to the other end of said driving rod, a toothed segment connected to said cross-over guide and arranged to rotate in response to the reciprocatory movement of said driving rod, and a gear wheel fixed to said axle and disposed in toothed engagement with said segment for rotating said axle as said segment rotates.

5. A windscreen wiper, as set forth in claim 1, wherein said wiper arm and said guide arm are each provided with a hinged joint in its end region adjacent said pivot arm, said hinged joints permitting movement of said wiper arm and said guide arm to a position at right angles to the longitudinal axis of said pivot arm.

* * * * *